(12) United States Patent
Overberg

(10) Patent No.: US 7,883,457 B2
(45) Date of Patent: Feb. 8, 2011

(54) HELICAL CONVEYOR CENTRIFUGE HAVING A PLANETARY GEAR DRIVE DEVICE

(75) Inventor: Martin Overberg, Herzebrock-Clarholz (DE)

(73) Assignee: Westfalia Separator GmbH, Oelde (DE)

( * ) Notice: Subject to any disclaimer, the term of this patent is extended or adjusted under 35 U.S.C. 154(b) by 127 days.

(21) Appl. No.: 12/293,512

(22) PCT Filed: Jun. 22, 2007

(86) PCT No.: PCT/EP2007/056255

§ 371 (c)(1),
(2), (4) Date: Sep. 18, 2008

(87) PCT Pub. No.: WO2007/147893

PCT Pub. Date: Dec. 27, 2007

(65) Prior Publication Data

US 2009/0247384 A1 Oct. 1, 2009

(30) Foreign Application Priority Data

Jun. 23, 2006 (DE) ...................... 10 2006 028 804

(51) Int. Cl.
*B04B 1/20* (2006.01)
*B04B 9/08* (2006.01)

(52) U.S. Cl. ................ 494/53; 494/84; 475/5
(58) Field of Classification Search .......... 494/50–54, 494/83–84; 210/380.3; 475/5, 225, 248
See application file for complete search history.

(56) References Cited

U.S. PATENT DOCUMENTS

| 2,867,378 | A | * | 1/1959 | Harlow | 494/8 |
| 3,187,997 | A | * | 6/1965 | Gooch | 494/53 |
| 3,343,786 | A | * | 9/1967 | Sharples | 494/51 |
| 4,299,353 | A | | 11/1981 | Bruning et al. | |
| 5,941,810 | A | | 8/1999 | Gay | |
| 6,387,032 | B1 | | 5/2002 | Beyer | |
| 2009/0247384 | A1 | * | 10/2009 | Overberg | 494/51 |
| 2010/0167902 | A1 | * | 7/2010 | Overberg et al. | 494/66 |

FOREIGN PATENT DOCUMENTS

| DE | 28 11 887 C3 | 9/1979 |
| DE | 4409520 A1 * | 9/1995 |
| DE | 94 09 109 U1 | 11/1995 |
| DE | 198 06 374 C1 | 7/1999 |

(Continued)

*Primary Examiner*—Charles E Cooley
(74) *Attorney, Agent, or Firm*—Barnes & Thornburg LLP

(57) ABSTRACT

A helical conveyor centrifuge, such as a solid-bowl or sieve-bowl centrifuge, includes a rotatable drum, a rotatable screw disposed within the drum, and a centrifuge drive for rotating the drum and the screw. The centrifuge drive is configured to set a differential speed between drum and screw. The centrifuge drive includes a first motor, a second motor, and a gearing arrangement disposed between the motors and also between the drum and the screw. The gearing arrangement includes a gearing arranged downstream of the motors and has a first gear, a second gear and a third gear stage. The first and second gear stages include at least four shafts. Torques are either introduced into or are taken off from the first and second gear stages. The first and second gear stages are disposed in a housing and driven by at least three of the at least four shafts.

29 Claims, 9 Drawing Sheets

FOREIGN PATENT DOCUMENTS

| | | | |
|---|---|---|---|
| EP | 0271898 A1 * | 6/1988 | |
| EP | 0 798 046 A1 | 10/1997 | |
| EP | 2098751 A1 * | 9/2009 | |
| FR | 2610058 A1 * | 7/1988 | |
| GB | 2239924 A * | 7/1991 | |
| GB | 2393142 A * | 3/2004 | |
| JP | 61-197062 | 9/1986 | |
| WO | WO 94/23223 | 10/1994 | |
| WO | WO 9948612 A1 * | 9/1999 | |
| WO | WO 02/081094 A1 | 10/2002 | |
| WO | WO 2004097255 A2 * | 11/2004 | |
| WO | WO 2007147893 A1 * | 12/2007 | |

* cited by examiner

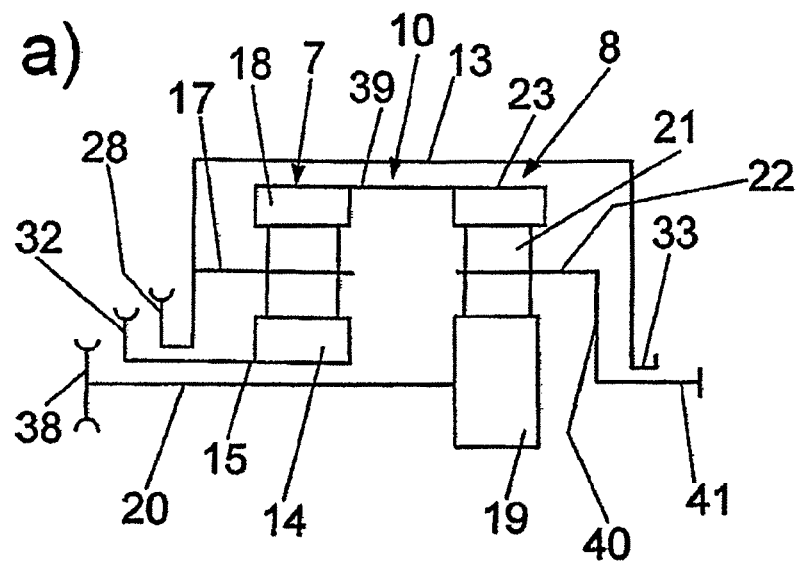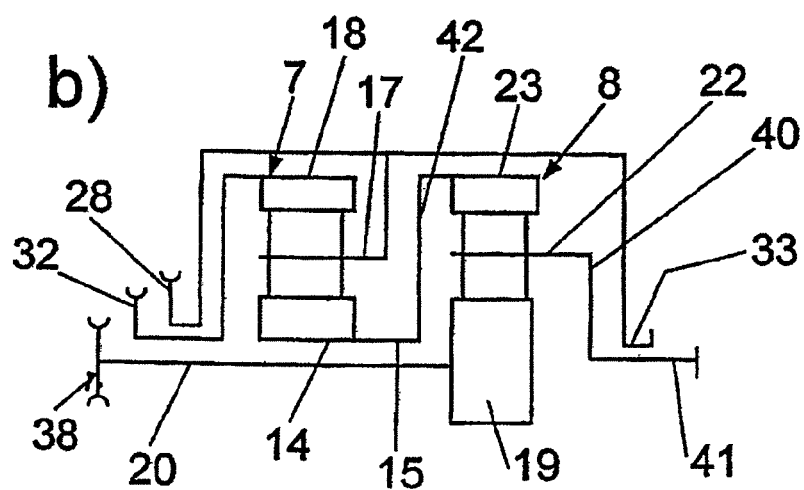
Fig. 3

HELICAL CONVEYOR CENTRIFUGE HAVING A PLANETARY GEAR DRIVE DEVICE

BACKGROUND AND SUMMARY

The present disclosure relates to a helical conveyor centrifuge.

Such a centrifuge can be configured as a solid-bowl helical conveyor centrifuge or as a sieve-bowl helical conveyor centrifuge.

DE 94 09 109 U1 discloses a centrifuge having an infinitely variable control of the differential speed between drum and broach.

WO 94/23223 shows a planetary gearing which is used to drive helical conveyor centrifuges.

From the magazine "Antriebstechnik 37 (1998, p. 39), a multistage differential gear drive is known. The gear drive has established itself as a gearing for driving decanters, since it allows a relatively good adjustment of differential speeds. As the preliminary stage it has a two-stage planetary gearing arrangement, which is configured as a four-shaft gearing, one shaft being secured during operation. The problem here is that, in order to cover a greater range of adjustable differential speeds, it is necessary to use a variety of variable speed and secondary motors or a variety of gear ratios. That makes standardization more difficult and, during operation, if a substantial change is made to the set differential speed, that may possibly necessitate a change of secondary motor.

According to DE 28 11 887 C3, two structurally mutually separate gearings are used as the gearing arrangement, which is relatively complex.

As part of the technological background, DE 198 06 374 C1, U.S. Pat. Nos. 3,343,786, 2,867,378 and WO 02/081094 are also cited.

EP 0 798 046 A1 discloses a centrifuge drive having two motors, a main motor and a variable speed motor, and a three-stage gearing. The first two gear stages are configured as epicyclic gear stages. At three shafts, a torque is either introduced into the gearing or is taken off therefrom. The output of the variable speed motor flows first into the first gear stage, from there into the second gear stage and from there to the downstream gear stage, so that the variable speed motor is necessarily designed for relatively large outputs. The gearing additionally poses the problem, in that it is relatively difficult to set small differential speeds in a precise manner.

The present disclosure is different in that it provides for a helical conveyor centrifuge in which a relatively large differential speed can be set without an exchange of a secondary motor. The present disclosure reveals that it is possible to set even small differential speeds in a relatively simple and precise manner.

The present disclosure relates to a helical conveyor centrifuge, such as a solid-bowl or sieve-bowl centrifuge. The centrifuge includes a rotatable drum, a rotatable screw disposed within the drum and a centrifuge drive for rotating the drum and the screw. The centrifuge drive is configured to set a differential speed between drum and screw. The centrifuge drive includes a first motor, a second motor, and a gearing arrangement disposed between the motors and also between the drum and the screw. The gearing arrangement includes a gearing arranged downstream of the motors, the gearing arrangement having a first gear, a second gear and a third gear stage. The first and second gear stages include at least four shafts, and torques are one of introduced into and taken off from the first and second gear stages. The first and second gear stages are disposed in a housing and are driven by at least three of the at least four shafts. The first motor feeds one of the torques into the housing via two of the at least four shafts, and the first motor feeds the torque into the first gear stage.

According to the present disclosure, at a total of at least four shafts, torques can be introduced into the first gear stage and the second gear stage or can be taken off from these two gear stages. The first and second gear stages are drivable, and generally also driven, at or by a total of at least three shafts, in which case the first motor firstly feeds a torque into the housing and secondly, at two shafts, feeds a torque into the first gear stage.

It is advantageous that the second motor for driving the second gear stage of the first gearing can remain the same for different differential speed ranges.

Moreover, the drawback, known from the prior art, that belt slippage, in the case of relatively small differential speeds, leads to unpredictable results, is avoided. Instead, the present disclosure allows a relatively precise setting of small differential speeds between drum and screw.

Moreover, the design according to the present disclosure is of simple and compact construction.

A presetting of the differential speed range can be realized in a simple manner by exchanging the belt drive for the first gear stage.

The accurate setting within the respective region is then effected by regulating or controlling the motor speed of the second motor.

The measure that the first gear stage is driven via three drive shafts, for example, via belt drives or directly and with two or three motors, means that no epicyclic power is generated and the number of belts can hence be kept low, so that the load upon the shafts in this region is low.

According to the present disclosure, a first motor is used as the main motor to drive the housing, so that an epicyclic gearing is realized. The main motor also drives the first gear stage doubly. Whereas, via a second motor, configured as a variable speed motor, a torque is introduced into the second gear stage, so that the screw is driven by the variable speed motor and by the main motor, whereas only the main motor rotates the drum.

It is expedient to split the power necessary for the screw drive between the secondary motor and the drum motor.

The variable speed motor then projects its speed range onto a small differential speed range.

The desired differential speed can hence be set with high accuracy. In terms of power, the variable speed motor and the associated frequency converter can be accurately designed for the range of adjustment which is necessary from a process engineering perspective and are thus not dimensioned unnecessarily large. The remaining power is supplied by the drum motor. In an embodiment of the present disclosure, this leads to better overall efficiency.

This splitting of the power between the two motors is managed in accordance with the movable differential speed ranges by varying the belt transmission ratio with the exchangeable pulleys.

Other aspects of the present disclosure will become apparent from the following descriptions when considered in conjunction with the accompanying drawings.

BRIEF DESCRIPTION OF THE DRAWINGS

FIG. 3a shows a structure of two gear stages of the centrifuge of FIG. 1.

FIG. 3b shows a structure of an alternative embodiment of the two gear stages for a centrifuge similar to that of FIG. 1.

FIG. 4 shows a sectional view of a gearing arrangement of the centrifuges of FIGS. 1 and 3a.

DETAILED DESCRIPTION

Figure 1:
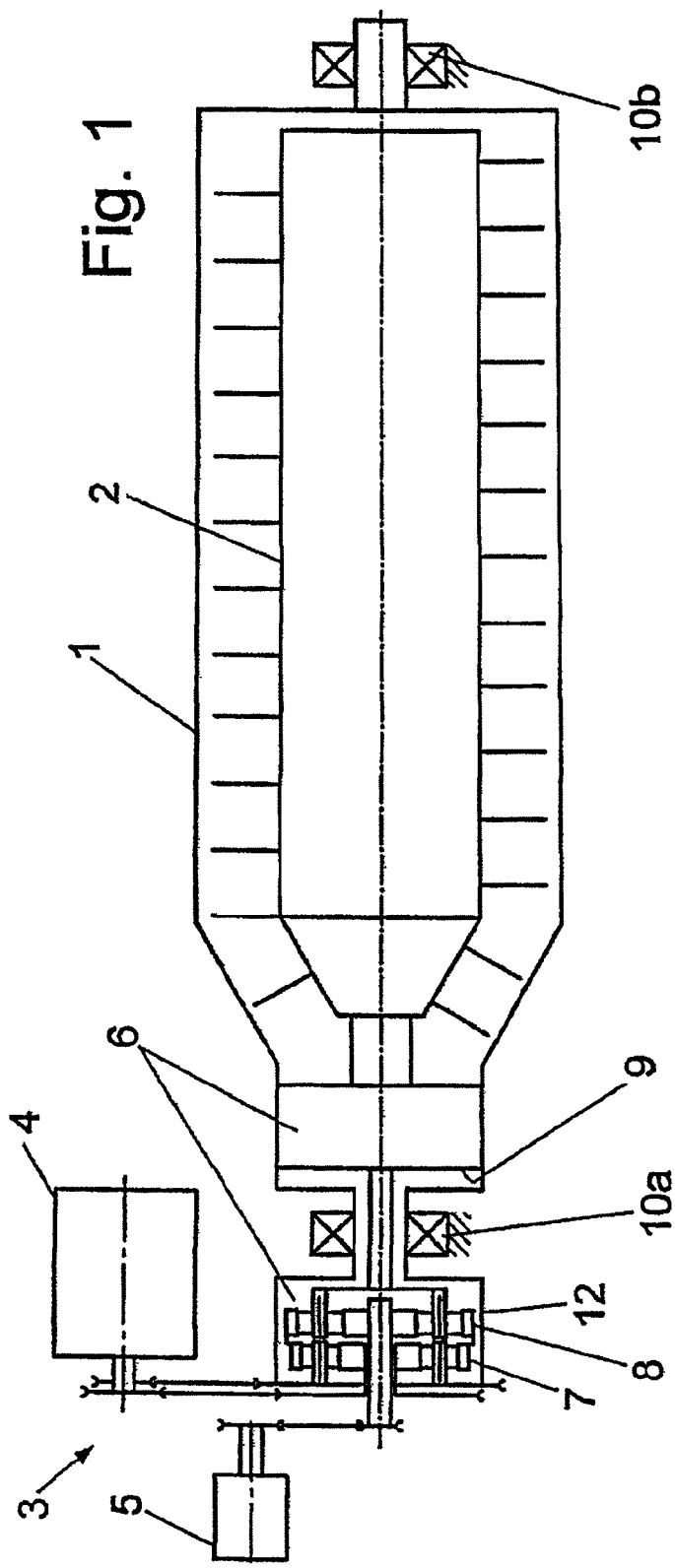
FIG. 1 shows a schematic representation of a solid-bowl helical conveyor centrifuge with a drive, according to the present disclosure.
Figure 2:
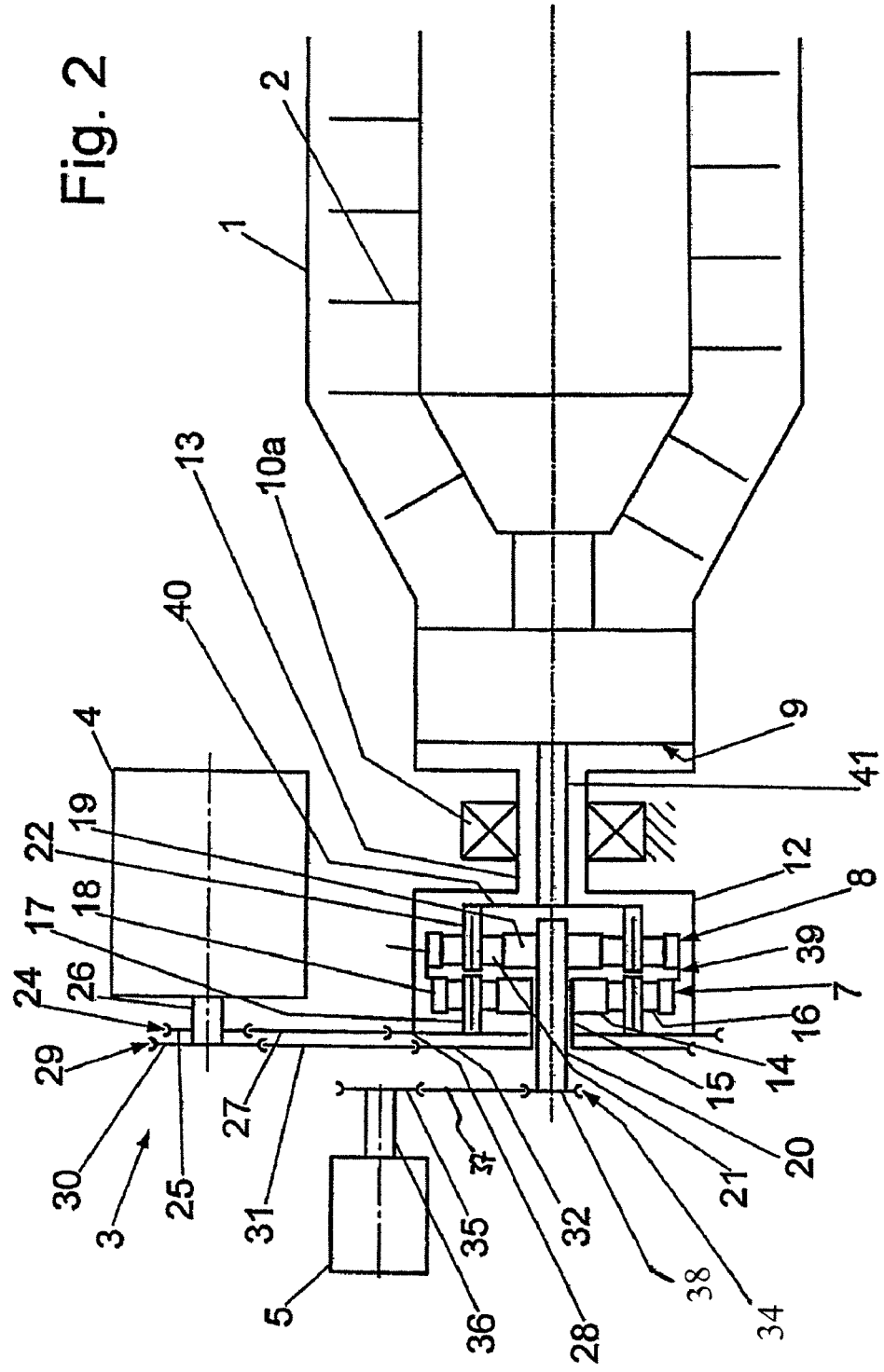
FIG. 2 shows an enlargement of a portion of FIG. 1.
Figure 4:
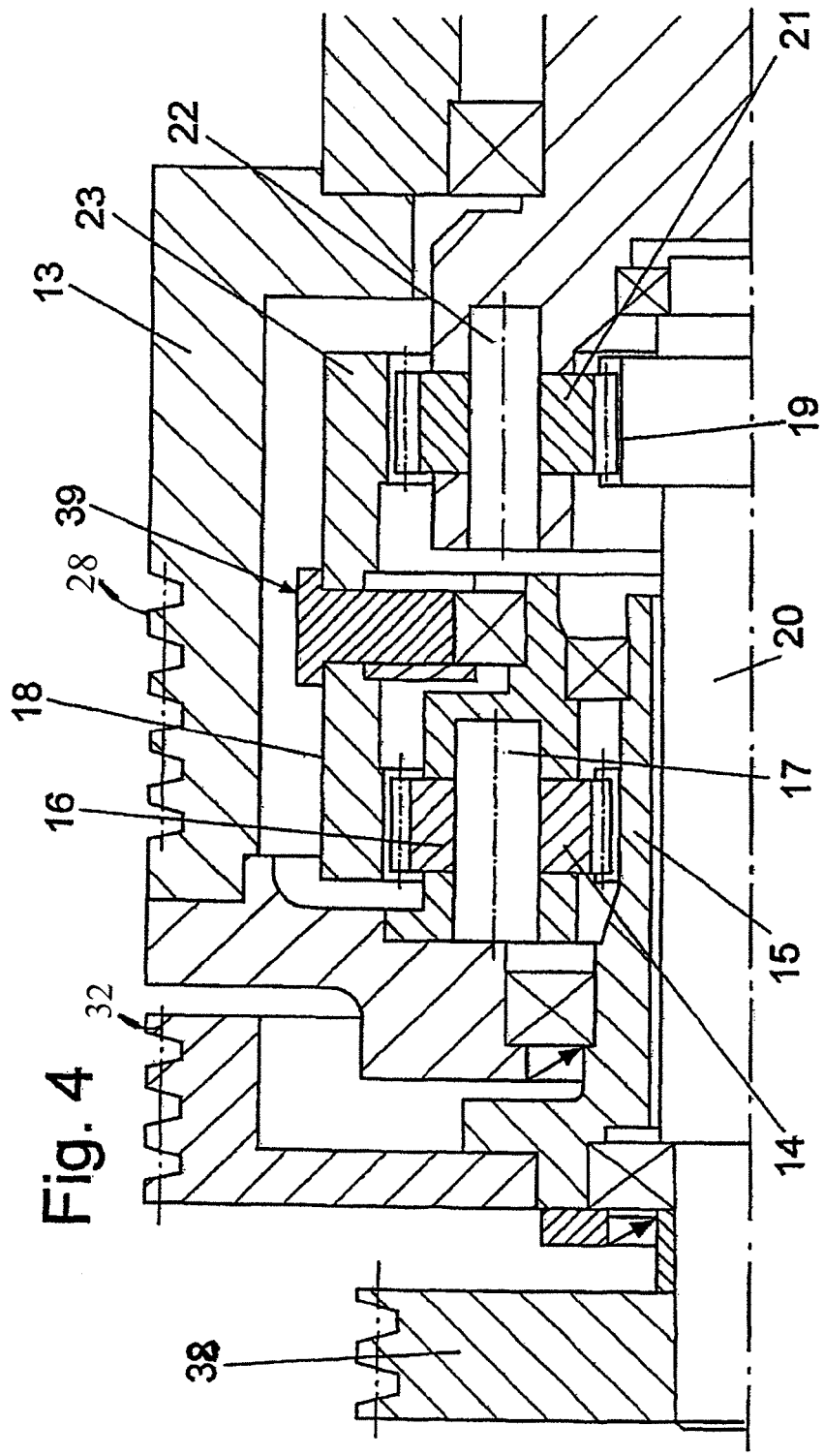

FIGS. 1, 2 and 3a are described first.

FIGS. 1 and 2 show a solid-bowl helical conveyor centrifuge comprising a rotatable drum 1, having a horizontal rotation axis, and a rotatable screw 2, which screw 2 is disposed within the drum 1 and has a centrifuge drive 3 for rotating the drum 1 and the screw 2. The drum 1 is disposed between drum bearings 10a, 10b, which are respectively arranged on a drive side and facing away from the centrifuge drive 3.

The centrifuge drive 3 includes a first motor 4, referred to as the main motor, and a second motor 5, referred to as the variable speed motor. Further included is a gearing arrangement disposed between the motors 4, 5 and also between the drum 1 and the screw 2.

The gearing arrangement may comprise only a single gearing 6 having three or more gear stages 7, 8, 9, which stages 7, 8, 9 are arranged downstream of the motors 4, 5. As shown in the embodiment, of FIGS. 1 and 2, the first two gear stages 7, 8 and the third gear stage 9 are disposed on the two axial sides of the drive-side drum bearing 10. Alternative embodiments, for example, having all gear stages 7, 8, 9 within (see FIG. 5) or outside (see FIG. 6) the drum bearing 10, relative to the drum 1, are likewise feasible.

The design of the gearing 6 shown is such that between the rotation speed of the drum 1 and the rotation speed of the screw 2 during operation, a differential speed can be set.

The first gear stage 7 and the second gear stage 8 of the gearing 6 are respectively configured in the style of a planetary gearing. The first gear stage 7 forms a type of preliminary stage and the second gear stage 8 forms a type of main stage, which are both disposed in a common housing 12 (see also FIG. 3a). The first and the second gear stages 7, 8 are designed in the style of an epicyclic gear. The housing 12 is co-driven, which in turn drives the drum 1, the latter being connected in a rotationally secure manner to the housing 12, which may be via a hollow shaft 13.

The first gear stage 7 has, in the housing 12, a sun gear 14 on a sun gear shaft 15, planetary gears 16 on planetary gear axles 17, which are combined to form a planet carrier 33, and an outer ring gear 18.

The second gear stage 8 has, within the housing 12, a sun gear 19 on a sun gear shaft 20, planetary gears 21 on planetary gear axles 22, which are combined to form a planet carrier 40, and an outer ring gear 23.

The first motor 4 drives directly (not shown) or indirectly, via a first wrap or belt drive 24 having a belt pulley 25 on its motor shaft 26, a belt 27 and a belt pulley 28, which is coupled in a rotationally secure manner to the housing 12 and the planetary gear axles 17 of the planetary gears 16 of the first gear stage 7, so that it here also forms the planet carrier 33, the housing 12 and the planetary gears 16. The belt pulley 28 can also, as shown in FIG. 3, be configured in one piece with the housing 12 or be configured on the outer periphery thereof.

In addition, the first motor 4 drives directly or indirectly, for example, via a second wrap or belt drive 29 having a belt pulley 30 on its motor shaft 26, a belt 31 and a belt pulley 32, the hollow shaft 15 for the sun gear 14 of the first gear stage 7.

The second motor 5 drives directly or indirectly, for example, via a third wrap or belt drive 34 having a belt pulley 35 on the motor shaft 36 of the second motor 5, having a belt 37 and a belt pulley 38, the sun gear shaft 20 of the sun gear 19 of the second gear stage 8.

If the first motor 4 drives the drum 1 elsewhere, the two belt drives 24, 29 could run via back-gearing arrangements.

In addition, the ring gear 18 is coupled via an intermediate piece to a ring gear 23 of the second gear stage 8 such that it is rotationally secure relative to an intermediate shaft 39, and is configured in one piece with said ring gear 23.

The planetary gear axles 22 of the planetary gears 21 of the second gear stage 12 drive, via the planet carrier 40, an intermediate shaft 41 for the third gear stage 9. The third gear stage 9, as a simple and multiple output gear stage, drives the screw 2, which is shown schematically.

Between the housing 12 and the intermediate shaft 41, a differential speed adjustable by the first and second gear stages 7, 8 can be realized. The differential speed, on the one hand, is determined by the rotation speed of the sun gear shaft 20 of the second gear stage 8 and, on the other hand, by the rotation speed of the intermediate shaft 39.

For the setting of the differential speed, the rotation speed of the sun gear shaft 20 of the sun gear 19 of the second gear stage 8 is brought with the second motor 5 to a defined speed.

The rotation speed of the intermediate shaft 39 is determined by the rotation speed of the sun gear shaft 15 of the sun gear 14 of the first gear stage 7 and is thus also dependent on the output speed of the first, or drum motor 4.

Both the sun gear shaft 15 and the housing 12 have a speed different from zero, the rotation speed of the housing 12 being fixedly coupled to the rotation speed of the sun gear shaft 15.

It is advantageous that the first two gear stages 7, 8 are disposed within the common, rotatable, housing 12, since this can be realized cost-effectively and is of compact construction.

The sun gear shaft 20 could, where appropriate, also be set at zero. In this way, a drive having just a single motor could be realized (see FIG. 7).

Alternatively, it is conceivable, for the embodiment of FIG. 2, to drive the sun gear shaft 15 with a third motor (not shown).

The embodiment, according to present disclosure, whereby the sun gear shaft 15 and the planetary gear axles 17 of the first gear stage 7, as well as the housing 12, are driven with the first motor 4 is cheaper and simpler.

In normal operation, all the wrap gearings or belt drives 24, 29, 34, as well as the first, drum motor 4 and the second motor 5, feed power into the rotary system, which includes the drum 1 and screw 2. Loss-suffering rotation and braking powers are thereby prevented.

In addition, the first gear stage 7 forms a type of preliminary stage, which acts with the second gear stage 8 as a kind of master primary gear stage.

According to the embodiment of FIGS. 1 and 2, as a result of the preliminary stage situated outside the drive-side drum bearing 10a, a dynamically rigid attachment to the rotary system is possible.

Figure 5:
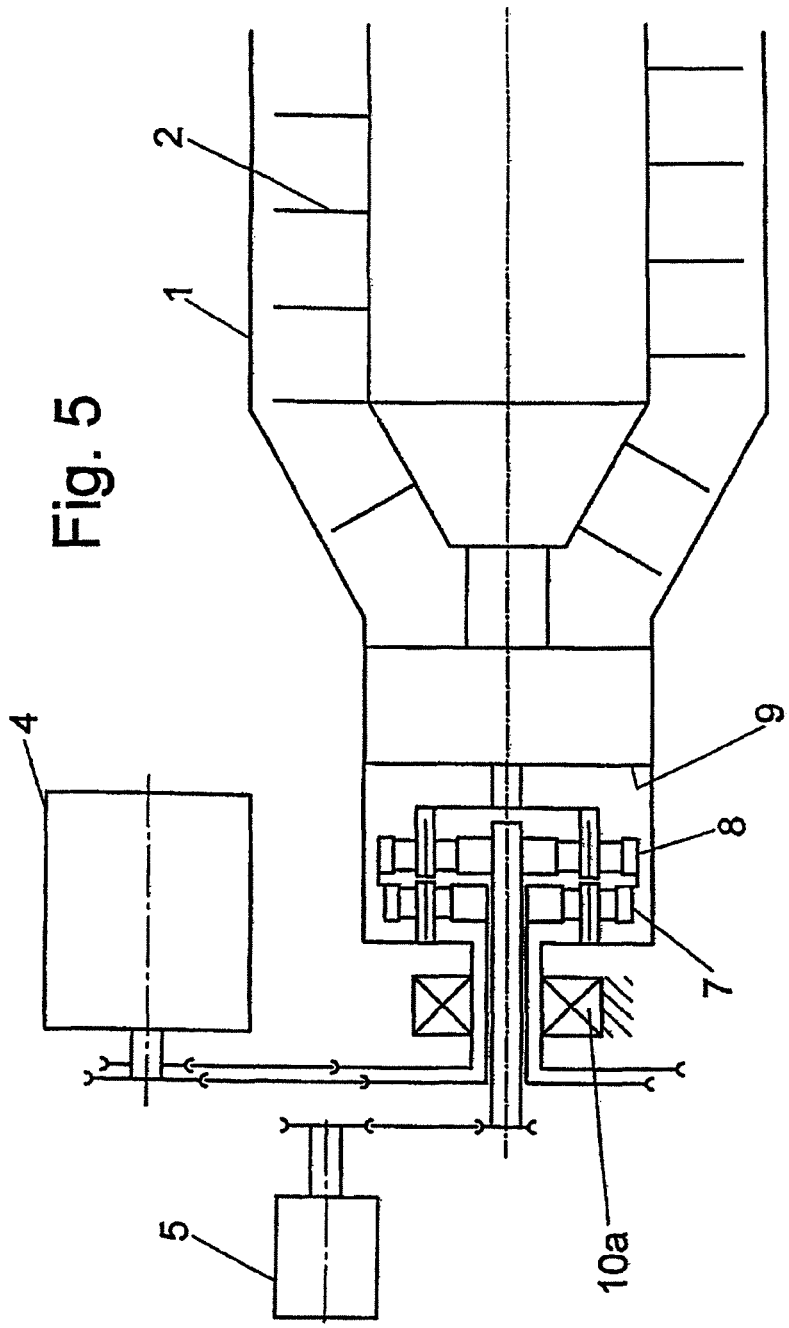
FIGS. 5-8 show alternative embodiments of the centrifuge of FIG. 2.

The first two gear stages 7, 8 can, however, also be arranged fully together and, where appropriate, with further stages, between the drive-side drum bearing 10a and the drum 1 (see FIG. 5, or relative to the drum 1 outside the drive-side drum bearing 10a.

An advantage of the embodiments of FIGS. 1 to 8, the dependence of the differential speed upon the slippage and upon the load state of the decanter is low.

Moreover, the secondary motor 5 can remain the same for different differential speeds. The power which is additionally needed at higher differential speeds derives from the first motor 4, which generally has greater reserves.

A changing of the belts 27, 31 or belt pulleys 25, 28, 30, 32, 35, 37, 38 enables the predefined differential speed range to be easily adjusted.

Figure 9:
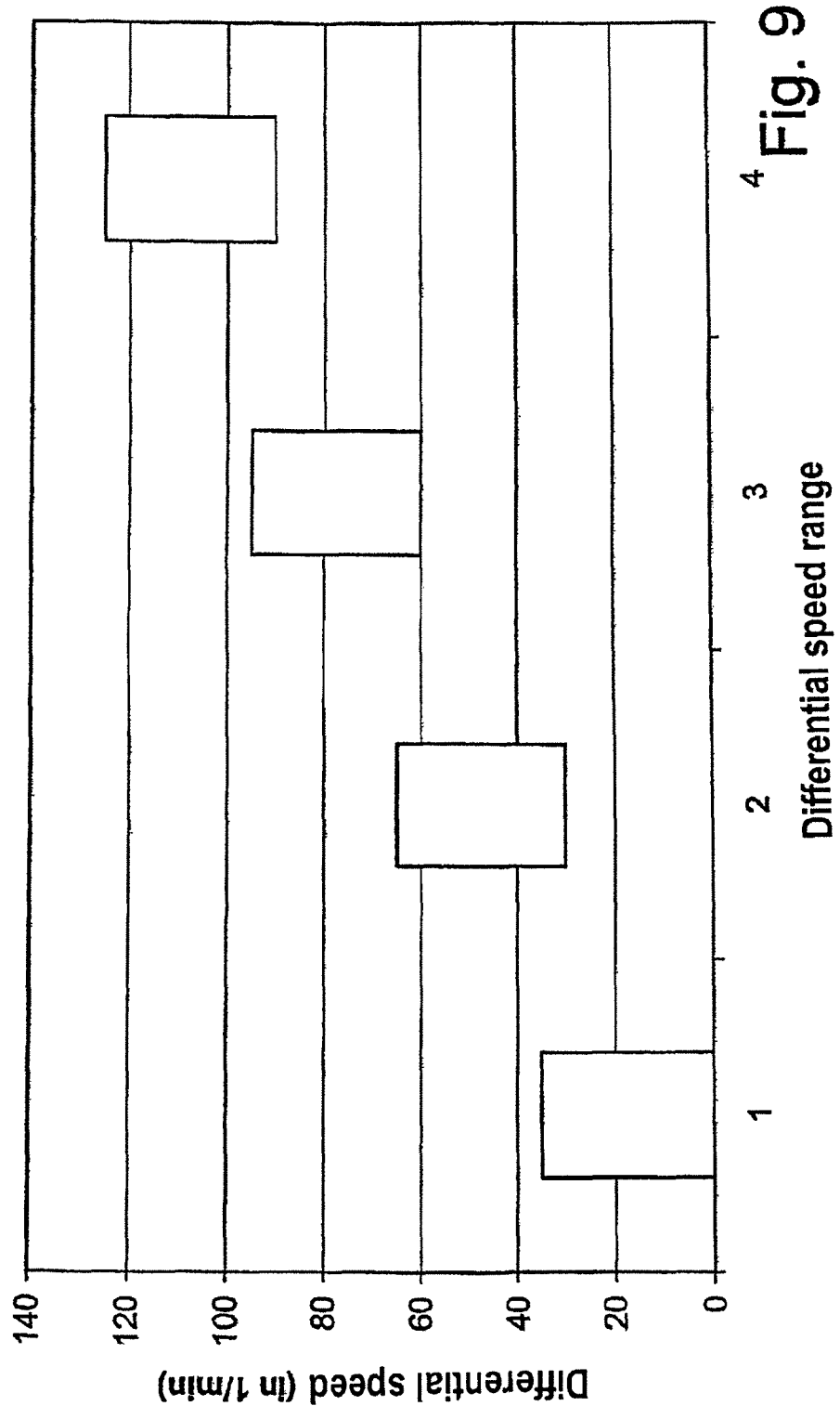
FIG. 9 shows a chart illustrating various differential speed ranges of the gearing arrangement of FIG. 1.

Mutually, where appropriate, partially overlapping differential speed ranges are conceivable, according to the scope of the present disclosure, as shown, for example, in FIG. 9. It is within the scope of the present disclosure, that respectively, for instance, by exchange of belt pulley 32 and/or of the other belt pulley 30 of this belt drive 29, four differential speed ranges "1, 2, 3 and 4", for example, can be suitably preset in a very simple manner. Such an exchange and presets can be tailored to the variable speed motor, within the ranges, by regulation or controlling of the motors 4 and 5, and particularly motor 5, the differential speed being able to be altered during operation within the given band widths.

The belt pulley 32 or the belt drive 29 of the first motor 4 generally serves for the presetting, for example, with an exchangeable pulley, of the differential speed range in accordance with FIG. 9.

By contrast, the second motor 5 serves as the variable speed drive. The drum rotation speed is set via the first belt drive, or the first wrap drive 24. The intermediate shaft 41, as the output shaft, simultaneously serves as the input shaft for the third gear stage 9, which can be realized in a wide variety of ways.

FIG. 3b shows an alternative embodiment of the present disclosure, in which the belt pulley 32 of the belt drive 29 of the first motor 4 is coupled not to the sun gear shaft 15 but to the ring gear 18 of the first gear stage 7 and drives the latter. In a further divergence from FIG. 3a, the sun gear shaft 15 is correspondingly coupled via an intermediate piece 42 to the ring gear 23 of the second gear stage 8.

Otherwise the structure of FIG. 3b corresponds to the structure of FIG. 3a or FIG. 1.

Figure 7:
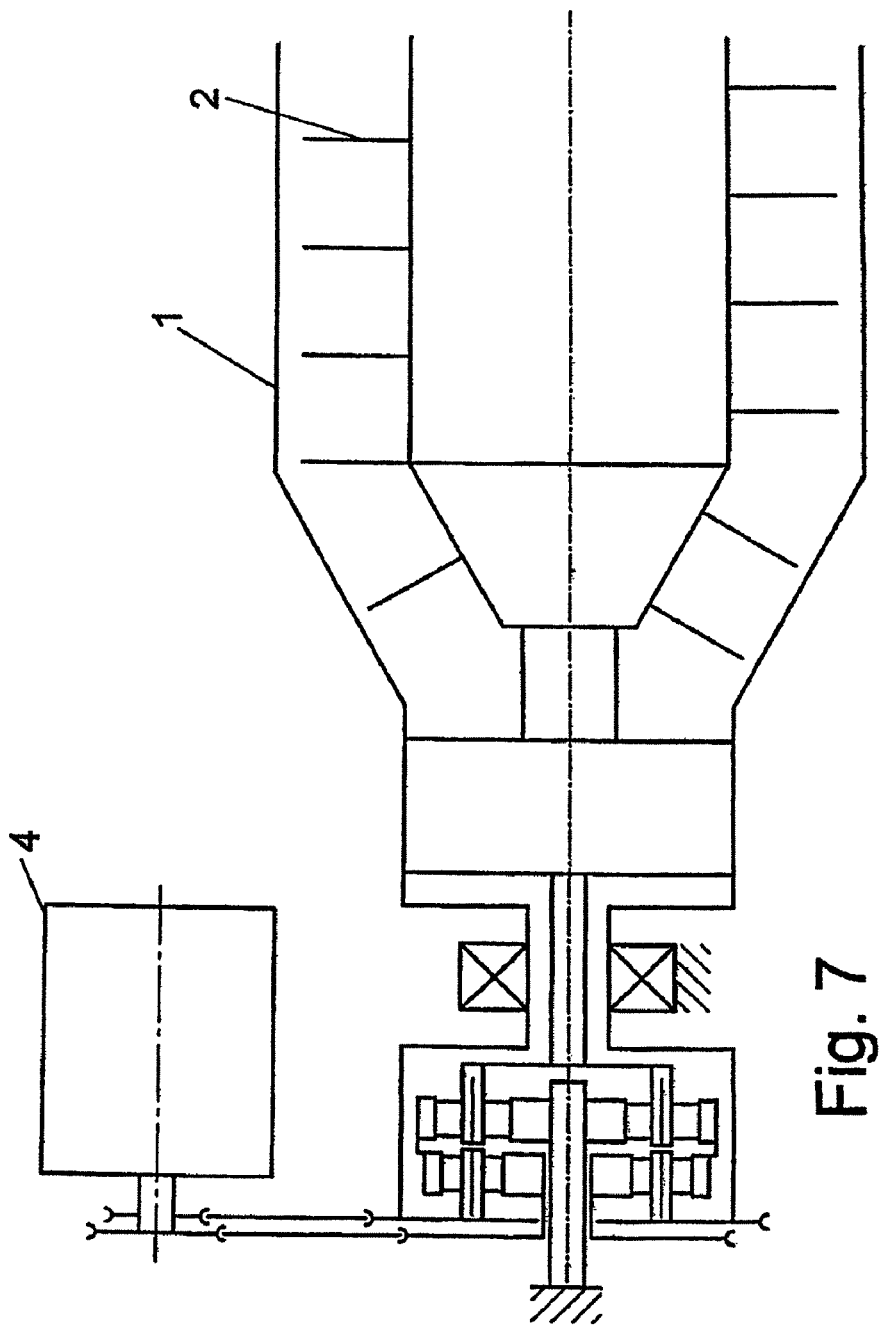

If the second motor 5, which acts basically as a variable speed motor, is omitted, and if the now free sun gear shaft 20 of the second gear stage 12 is secured, an unregulated drive can be realized (see FIG. 7). At the fixed shaft, the torque is respectively measured and an overload protection can be realized.

In contrast to known differential gearings, the belt pulley 38 of FIG. 1 for a leading screw 2, according to FIGS. 3a and 3b, is driven oppositely to the rotational direction of the drum 1. In order to ensure that the screw 2, together with an eccentric gearing, leads, no reversal of the rotational direction takes place in the second gear stage 8 of the gearing 6.

Figure 6:
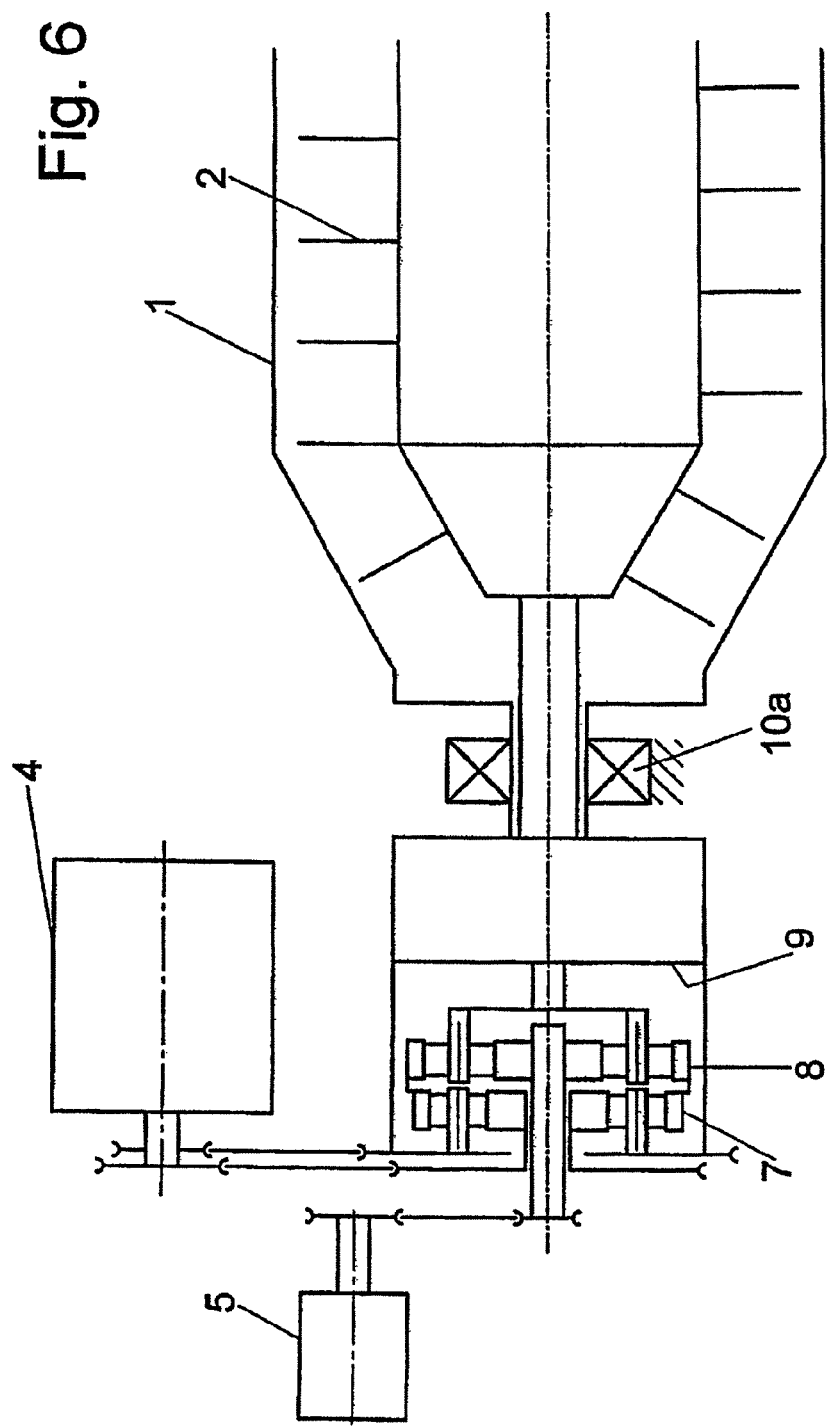

In the embodiments of FIGS. 1, 2 and 3a, and in those of FIGS. 5 and 6, the differential speed is proportional to the speed difference between the sun gear shafts 15 and 20. Since the sun gear shaft 20 of the second gear stage 8 here rotates oppositely to the drum 1, the speed difference between the sun gear shaft 15 and sun gear shaft 20 of the first and the second gear stages 7, 8 is increased if the sun gear shaft 15 of the first gear stage 7 is brought to a rotation speed between zero and the drum speed or greater than the drum speed. That is so because the sun gear shaft 15 is jointly driven by the main motor 4. The differential speed thereby increases in the desired manner.

In the embodiment of FIG. 3b, this effect is made stronger than in the version of FIG. 3a, so that the latter version may be preferred.

Figure 8:
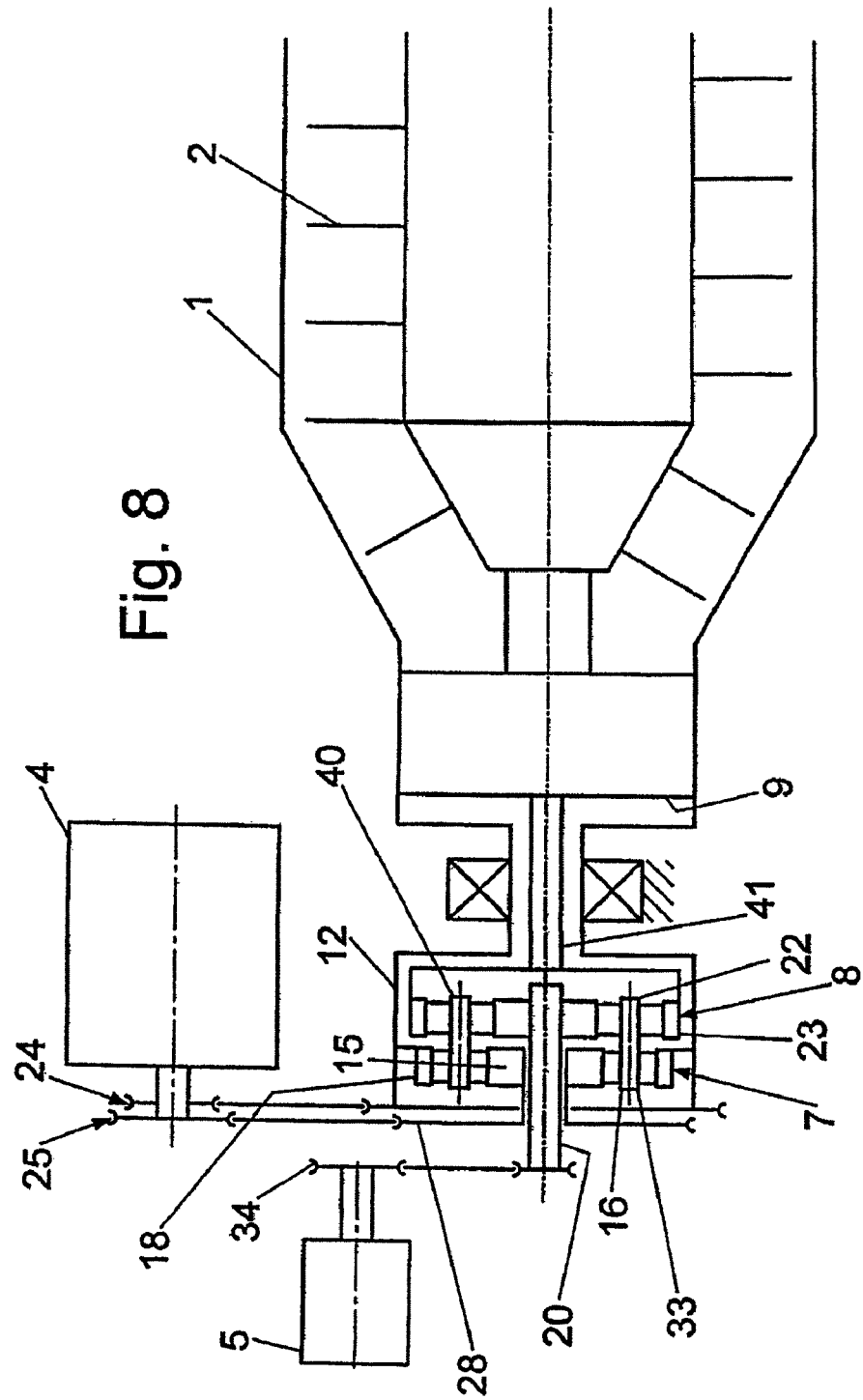

According to the embodiment of FIG. 8, a torque is likewise introduced into the first and second gear stages 7, 8 at three shafts. First belt pulley 28 drives the ring gear 18 and the second belt pulley drives the sun gear 15. However, the planetary gear axles 16 of the first gear stage 7 are coupled to the planetary gear axles 22 of the second gear stage 8. The variable speed motor 5 in turn drives the sun gear shaft 20 of the second gear stage 8, whereas the ring gear 23 of the second gear stage 8 drives the intermediate shaft 41 for the third gear stage 9.

In the just described embodiment, no rotation speed reversal takes place, which, in combination with a planetary gearing of conventional construction, results in a leading screw.

It is within the scope of the present disclosure that, where appropriate, no second motor 5 is provided and the sun gear shaft 20 of the second gear stage 12 is secured in a twistproof manner.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A helical conveyor centrifuge, such as a solid-bowl or sieve-bowl centrifuge, comprising:
    a rotatable drum;
    a rotatable screw disposed within the drum;
    a centrifuge drive for rotating the drum and the screw, the centrifuge drive configured to set a differential speed between drum and screw;
    wherein the centrifuge drive includes a first motor, a second motor, and a gearing arrangement disposed between the motors and also between the drum and the screw and which gearing arrangement includes a gearing arranged downstream of the motors and having a first gear, a second gear and a third gear stage;
    wherein the first and second gear stages include at least four shafts, and torques are one of introduced into and taken off from the first and second gear stages;
    wherein the first and second gear stages are disposed in a housing and are driven by at least three of the at least four shafts; and
    wherein the first motor feeds one of the torques into the housing and the first motor feeds another of the torques into the first gear stage via two of the at least four shafts.

2. The helical conveyor centrifuge as claimed in claim 1, wherein the first and second gear stages are disposed in a common rotatable housing.

3. The helical conveyor centrifuge as claimed in claim 2, wherein the housing is connected rotationally and secured to the drum.

4. The helical conveyor centrifuge as claimed in claim 1, wherein the second motor is a variable speed motor and feeds a torque into the second gear stage.

5. The helical conveyor centrifuge as claimed in claim 4, wherein the screw is driven jointly by the variable speed motor and by the first motor, and the first motor alone rotates the drum.

6. The helical conveyor centrifuge as claimed in claim 1, wherein
    the first gear stage is configured to include a first planetary gearing, a first sun gear, first planetary gears first planetary gear axles on a first planet carrier, and a first ring gear; and the second gear stage is configured to include a second planetary gearing, a second sun gear, second planetary gears, second planetary gear axles on a second planet carrier, and a second ring gear.

7. The helical conveyor centrifuge as claimed in claim 6, wherein
the first motor drives, one of directly and via a gear connection,
the housing,
the first planet carrier of the first gear stage, and
a first sun gear shaft of the first gear stage, and
the second motor
drives a second sun gear shaft of the second gear stage.

8. The helical conveyor centrifuge as claimed in claim 7, wherein the second motor directly drives the second sun gear shaft of the second gear stage.

9. The helical conveyor centrifuge as claimed in claim 7, wherein the first motor drives the first sun gear shaft of the first gear stage via a second wrap drive.

10. The helical conveyor centrifuge as claimed in claim 7, wherein the first sun gear shaft of the first gear stage is connected in a rotationally secure manner to the second ring gear of the second gear stage.

11. The helical conveyor centrifuge as claimed in claim 7, wherein the second motor is a variable speed motor and, for setting of a differential speed, the second motor drives the second sun gear shaft of the second gear stage.

12. The helical conveyor centrifuge as claimed in claim 7, further including a third motor and one of the motors drives the housing and the first planet carrier of the first gear stage, one of the motor drives the second sun gear shaft of the second gear stage, and one of the motor drives one of the first sun gear shaft and the ring gear of the first gear stage.

13. The helical conveyor centrifuge as claimed in claim 7, wherein a the first belt pulley drives the first ring gear and a second belt pulley drives the first sun gear, the first planetary gear axles of the first gear stage are coupled to the second planetary gear axles of the second gear stage, the second motor drives the second sun gear shaft of the second gear stage and, whereas the second ring gear of the second gear stage drives an intermediate shaft for a third gear stage.

14. The helical conveyor centrifuge as claimed in claim 7, wherein the second motor is not included and the second sun gear shaft of the second gear stage is secured in a twistproof manner.

15. The helical conveyor centrifuge as claimed in claim 7, wherein the gear connection is a wrap drive.

16. The helical conveyor centrifuge as claimed in claim 6, wherein
the first motor drives, one of directly and via a gear connection,
the housing,
the first ring gear of the first gear stage, and
the first planet carrier of the first gear stage, and
the second motor
drives a second sun gear shaft of the second gear stage.

17. The helical conveyor centrifuge as claimed in claim 6, wherein the first motor drives the housing and the first planet carrier of the first gear stage via a first wrap drive.

18. The helical conveyor centrifuge as claimed in claim 6, wherein the first motor drives the first ring gear of the first gear stage via a second wrap drive.

19. The helical conveyor centrifuge as claimed in claim 18, wherein the second wrap drive includes at least one belt pulley configured to be exchangeable.

20. The helical conveyor centrifuge as claimed in claim 19, wherein at least one of the at least one belt pulleys forms the first planet carrier of the first gear stage.

21. The helical conveyor centrifuge as claimed in claim 19, wherein at least one of the at least one belt pulleys of a first belt drive is formed as one piece with the housing.

22. The helical conveyor centrifuge as claimed in claim 21, wherein at least one of the at least one belt pulleys of the first belt drive is configured directly on an outer periphery of the housing.

23. The helical conveyor centrifuge as claimed in claim 6, wherein the first ring gear of the first gear stage and the second ring gear of the second gear stage are linked to form an intermediate shaft.

24. The helical conveyor centrifuge as claimed in claim 6, wherein the second planetary gear axles of the second gear stage drive a third gear stage, the drive being done via at least one of the second planet carrier and an intermediate shaft and which drive delivers a torque to and drives the rotatable screw.

25. The helical conveyor centrifuge as claimed in claim 6, wherein the first ring gear of the first gear stage and the second ring gear of the second gear stage are connected in a rotationally secure manner.

26. The helical conveyor centrifuge as claimed in claim 1, wherein the first and second gear stages are coupled directly to each other.

27. The helical conveyor centrifuge as claimed in claim 1, wherein the first and second gear stages and the housing are driven by three wrap drives.

28. The helical conveyor centrifuge as claimed in claim 1, wherein the first and second gear stages are disposed between a drive-side drum bearing and the drum.

29. The helical conveyor centrifuge as claimed in claim 1, wherein the first and second gear stages are disposed outside a drive-side drum bearing of the drum.

* * * * *